(12) United States Patent
Myers

(10) Patent No.: US 8,579,348 B1
(45) Date of Patent: Nov. 12, 2013

(54) SLIDING LID WITH OBJECT RETURN FEATURE

(75) Inventor: Ronald W. Myers, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/490,366

(22) Filed: Jun. 6, 2012

(51) Int. Cl.
*B60R 7/04* (2006.01)

(52) U.S. Cl.
USPC ........................................ 296/24.34

(58) Field of Classification Search
USPC .............................. 296/24.34, 37.8
See application file for complete search history.

(56) References Cited

U.S. PATENT DOCUMENTS

| | | | | |
|---|---|---|---|---|
| 6,883,852 B2 * | 4/2005 | Laskey | ......................... | 296/37.8 |
| 7,287,795 B1 * | 10/2007 | Thomas | ..................... | 296/24.34 |
| 7,475,954 B1 * | 1/2009 | Latunski | ........................ | 312/297 |
| 7,540,391 B2 * | 6/2009 | Kato | .............................. | 220/252 |
| 7,735,538 B2 * | 6/2010 | Ogawa | .......................... | 160/230 |
| 7,794,000 B2 * | 9/2010 | Ichimaru | ..................... | 296/24.34 |
| 8,007,020 B2 * | 8/2011 | Hipshier et al. | ............. | 296/37.8 |
| 2007/0102463 A1 * | 5/2007 | Thomas | ........................ | 224/275 |
| 2009/0072568 A1 | 3/2009 | Luginbill et al. | | |
| 2009/0133316 A1 | 5/2009 | Richter | | |
| 2013/0134729 A1 * | 5/2013 | Zimmerman et al. | ..... | 296/24.34 |

* cited by examiner

*Primary Examiner* — H Gutman
(74) *Attorney, Agent, or Firm* — Standley Law Group LLP

(57) ABSTRACT

A flexible sliding lid assembly including a guided lid comprised of a plurality of flexibly interconnected lid segments. The lid includes a rib or a plurality of spaced ribs that extend upward from a top surface of the lid along a rear portion thereof. A cover plate overlies at least a portion of the lid when the lid is in an opened position. The cover plate includes one or more grooves in which the rib/ribs travel when the lid is slidably opened and closed. If an object residing on the lid during lid opening passes through a gap between the lid and the cover plate, the object will be caught by the projecting rib(s), trapped between the top of the lid and the cover plate, and returned to an exposed position along the rear of the lid for easy retrieval when the lid is subsequently closed.

20 Claims, 6 Drawing Sheets

SLIDING LID WITH OBJECT RETURN FEATURE

TECHNICAL FIELD

The present invention is directed to a flexible sliding lid, such as a lid that may be used to cover, for example, a storage compartment in a vehicle.

BACKGROUND

Various devices may be equipped with sliding lids of different design. Of particular interest with respect to the present invention are tambour-style (flexible) sliding lids, which typically include a number of strips or segments that are flexibly joined to permit sliding of the lid along a curved path. This type of lid has been used for many years on furniture, such as roll top desks. This type of lid has also made its way into the automotive field, and may be found in use as a cover element for a storage compartment—most commonly a center console storage compartment.

As would no doubt be familiar to many, current vehicle storage compartment flexible lid designs may allow objects resting on the lid to pass along with the lid into a substantially inaccessible area of the associated storage compartment structure when the lid is retracted. This makes retrieval of such objects difficult if not impossible without disassembling the storage compartment.

As illustrated in the transparent view of FIG. 1A, certain known vehicle storage compartment 5 designs attempt to provide a minimized gap 10 (or actual interference), between a top surface of a flexible sliding lid 15 and an overlying portion 20 of the storage compartment housing 25 in order to prevent the passage of objects into the storage compartment interior. The idea behind this design is that the overlying portion 20 of the storage compartment housing 25 will act as a barrier to entry of objects into the storage compartment housing. Unfortunately, if the provided gap 10 is larger than intended due to manufacturing tolerances or to a change in part dimensions (e.g., due to aging or temperature), or if an intended interference fit fails to interfere for the same or similar reasons, then objects may still pass between the lid 15 and the overlying portion 20 of the housing structure and into the interior of the storage compartment housing 25.

As depicted in FIG. 1B, an alternative known design vehicle storage compartment 30 design employs a somewhat flexible rubber guard 35 to prevent objects from passing into the interior of the storage compartment housing 40 when the flexible sliding lid 45 is opened. The guard 35 extends downward from an overlying portion 50 of the compartment housing 40 to contact the lid 45 across its entire upper surface, and to block the passage of objects into the interior of the storage compartment housing 40 when the lid is retracted. Unfortunately, it has been found that this design suffers from problems similar to those described above with respect to the design of FIG. 1A, and objects still undesirably get past the guard 35 and find their way into the interior of the storage compartment housing 40. Causing the guard 35 to exert a greater contact force on the sliding lid 45 may reduce the number of objects that get past the guard but, as should be obvious, also makes sliding of the lid more difficult.

In light of the problems associated with known vehicle storage compartment designs, it would be desirable to provide a storage compartment design that prevents objects that inadvertently pass with an associated flexible lid into the interior of the storage compartment from being lost. The sliding lid design of the present invention provides this function.

SUMMARY

The present invention is directed to a storage compartment flexible lid assembly designed to prevent objects that pass between the lid and a guard and/or an overlying portion of a storage compartment housing from being lost within the storage compartment. To this end, the flexible lid assembly includes a sliding flexible lid having one or a series of spaced ribs that extend upward from a top surface of the lid along a rear portion thereof. The rib or ribs block objects from passing between the lid and the storage compartment housing when the lid is in a closed position and collect objects that pass with the lid into the storage compartment when the lid is opened.

The lid assembly includes a cover plate, which may or may not be a part of the storage compartment housing. The cover plate includes a groove or a series of grooves that correspond to and are aligned with the rib/ribs on the lid. The groove/grooves extend linearly along an inner wall of the cover plate in the direction of travel of the lid, thereby forming a lid track. The rib/ribs on the lid extend into and ride in the groove/grooves in the cover plate when the lid is slidably opened and closed.

If an object that is small enough to pass between the lid and the cover plate or an overlying housing portion resides on the lid during lid opening, the object will pass into the space between the lid and cover plate, where it will be caught by the projecting rib/ribs. The object is thus prevented from passing entirely over the lid and into an inaccessible interior space of the storage compartment housing. When the lid is subsequently closed, the object will remain on the lid surface and will be moved along with the lid due to supporting contact with the rib/ribs. As the lid becomes more fully closed, the object will be extracted from the lid track area and returned to an exposed position along the rear of the lid so that the object may be easily retrieved.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1A:
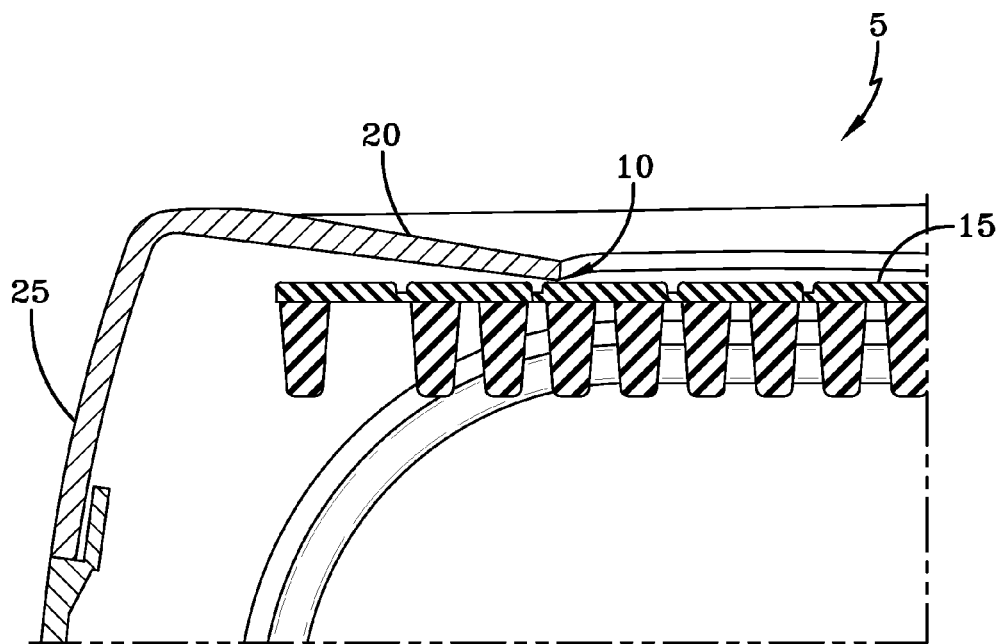
FIGS. 1A and 1B illustrate known storage compartment sliding flexible lid designs.
Figure 1B:
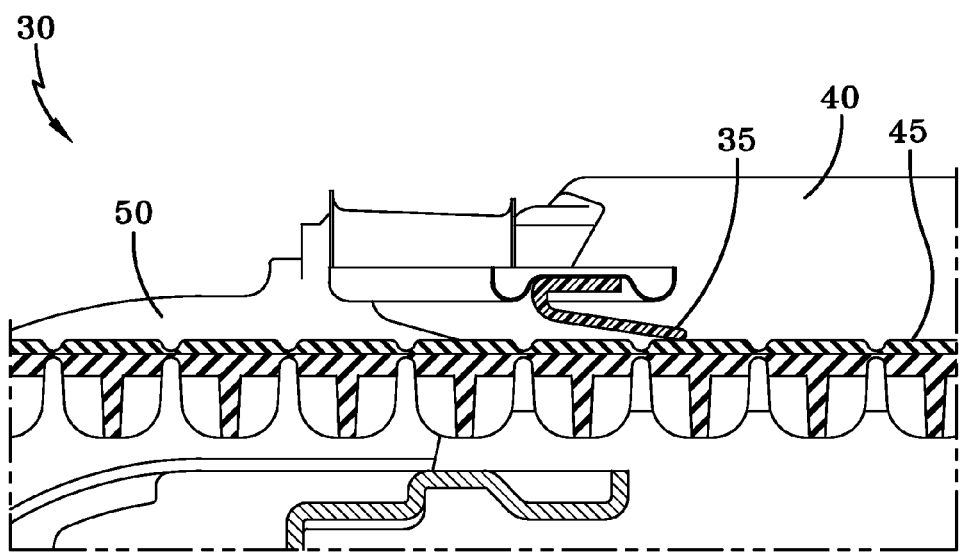
Figure 2:
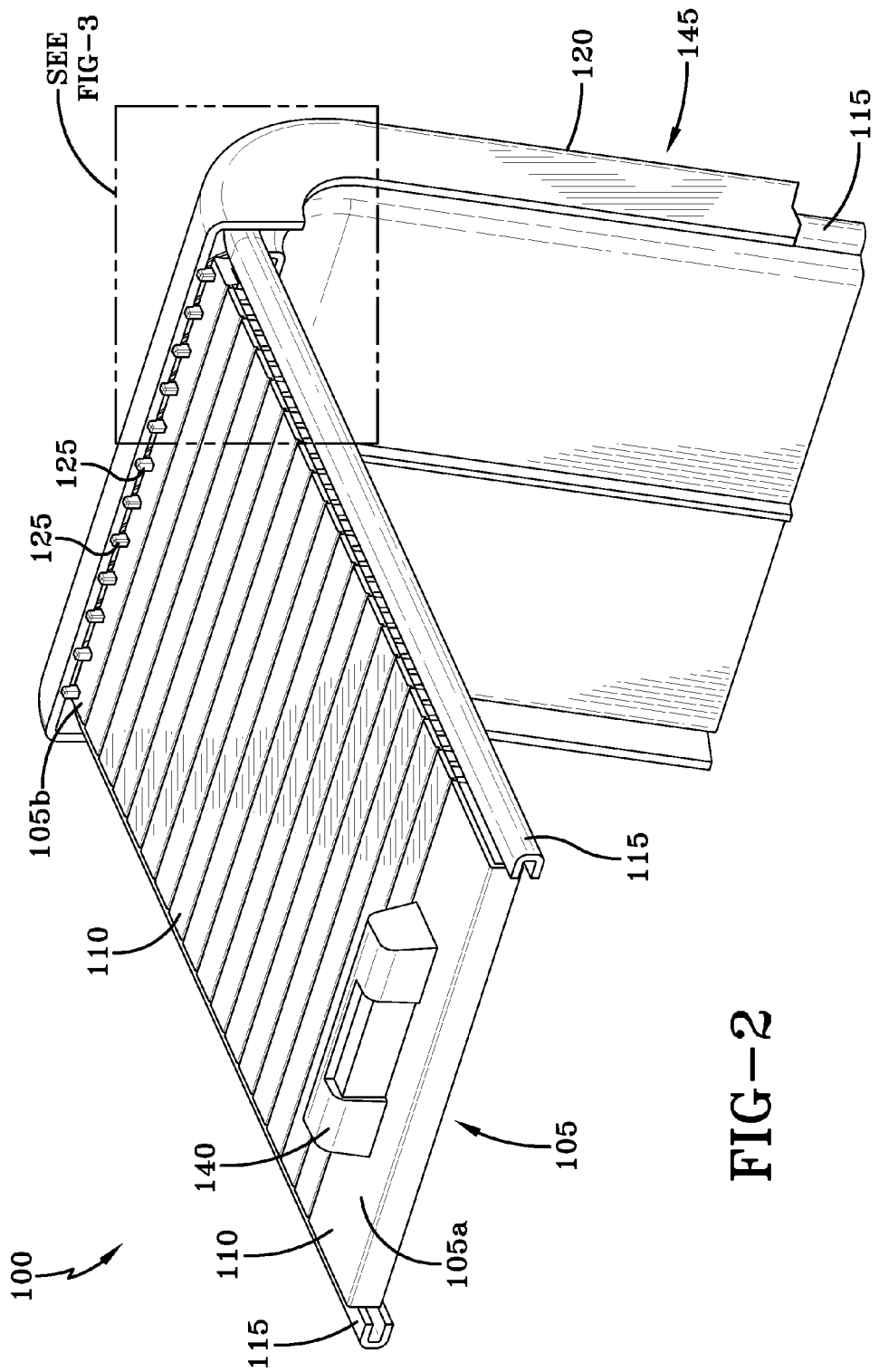
FIG. 2 is an isometric view of an exemplary embodiment of a storage compartment sliding flexible lid assembly of the present invention, with associated storage compartment housing components removed for clarity.
Figure 3:
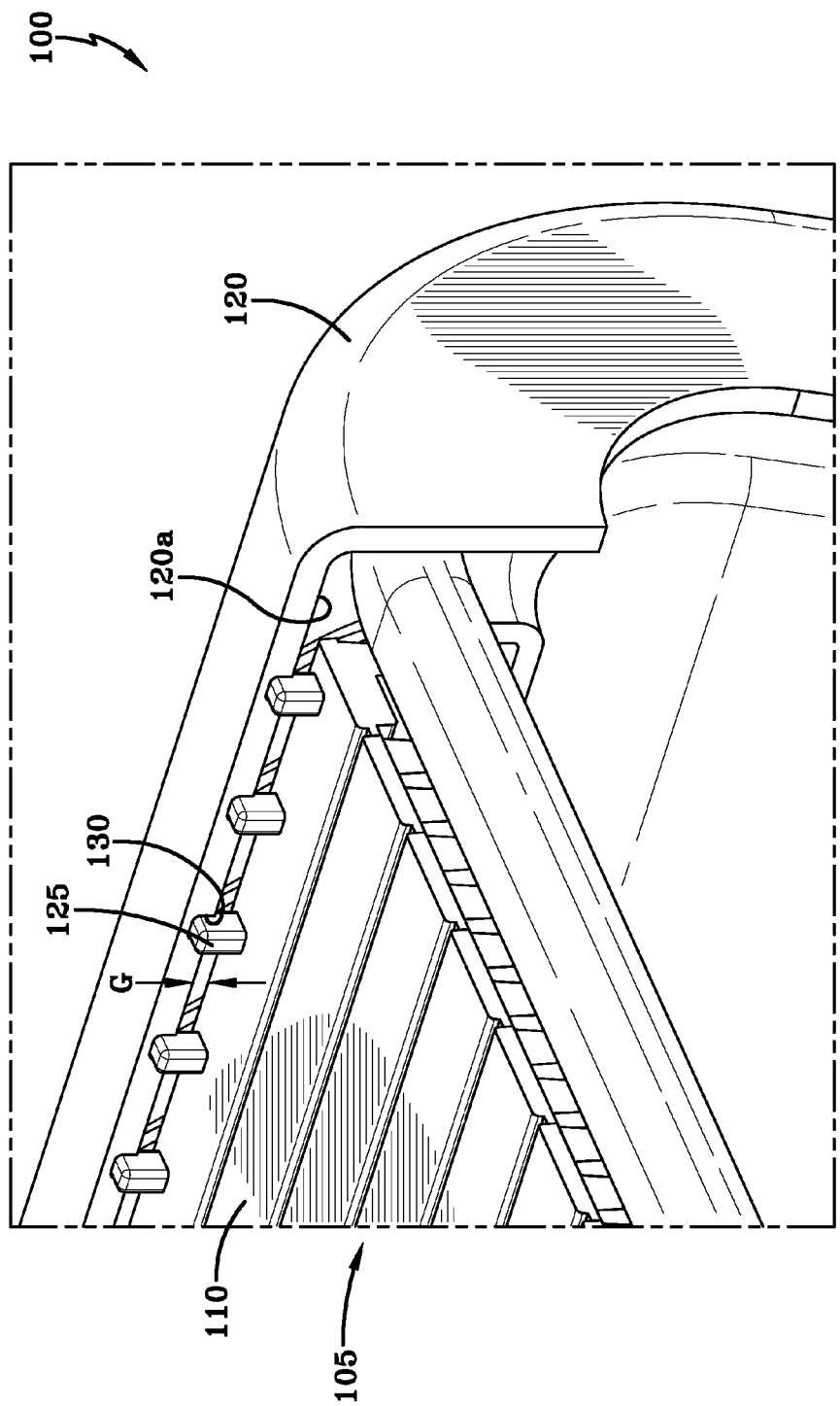
FIG. 3 is an enlarged view of a portion of the sliding flexible lid assembly as indicated in FIG. 2.
Figure 4:
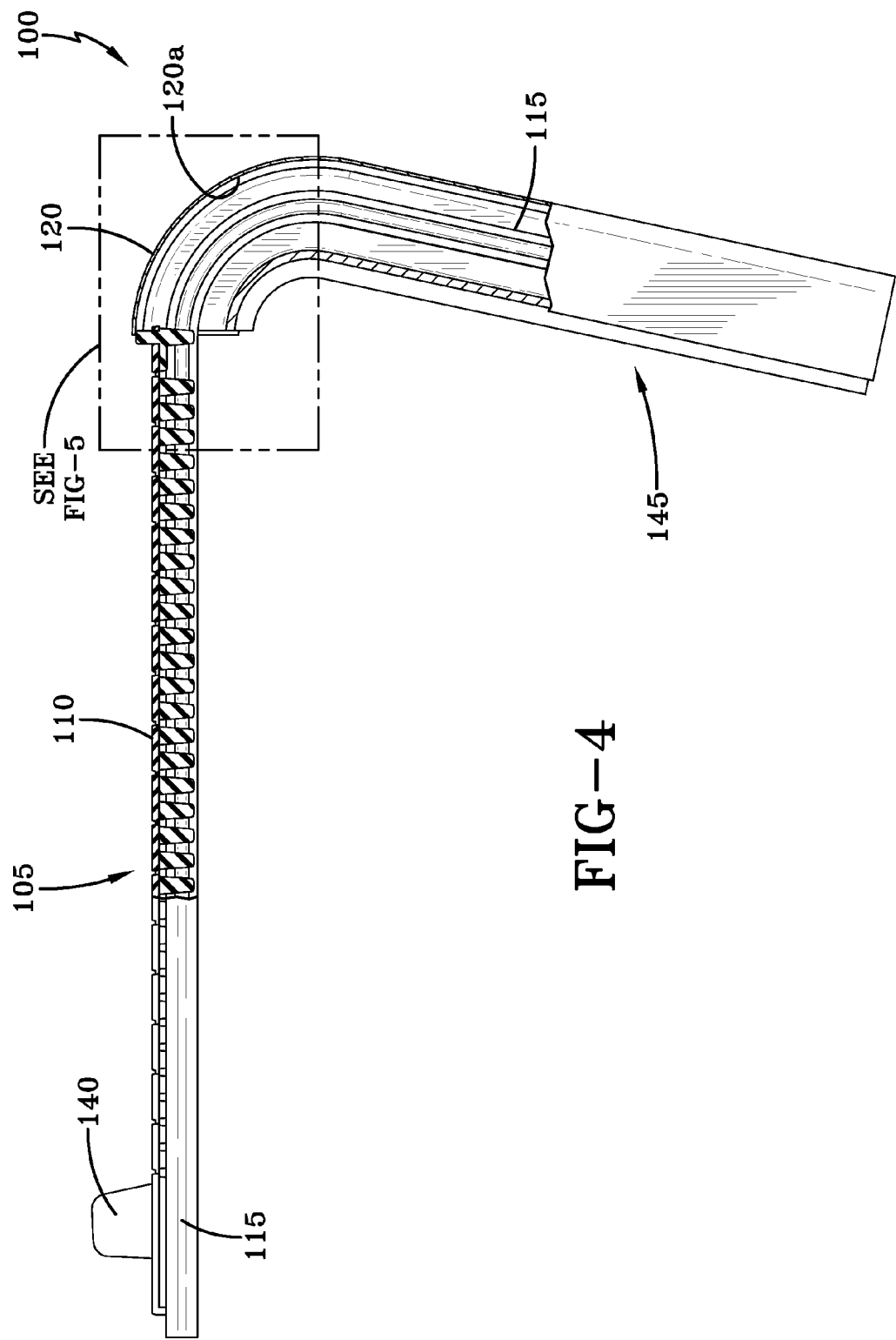
FIG. 4 is a side view of the exemplary sliding flexible lid assembly of FIG. 2.
Figure 5:
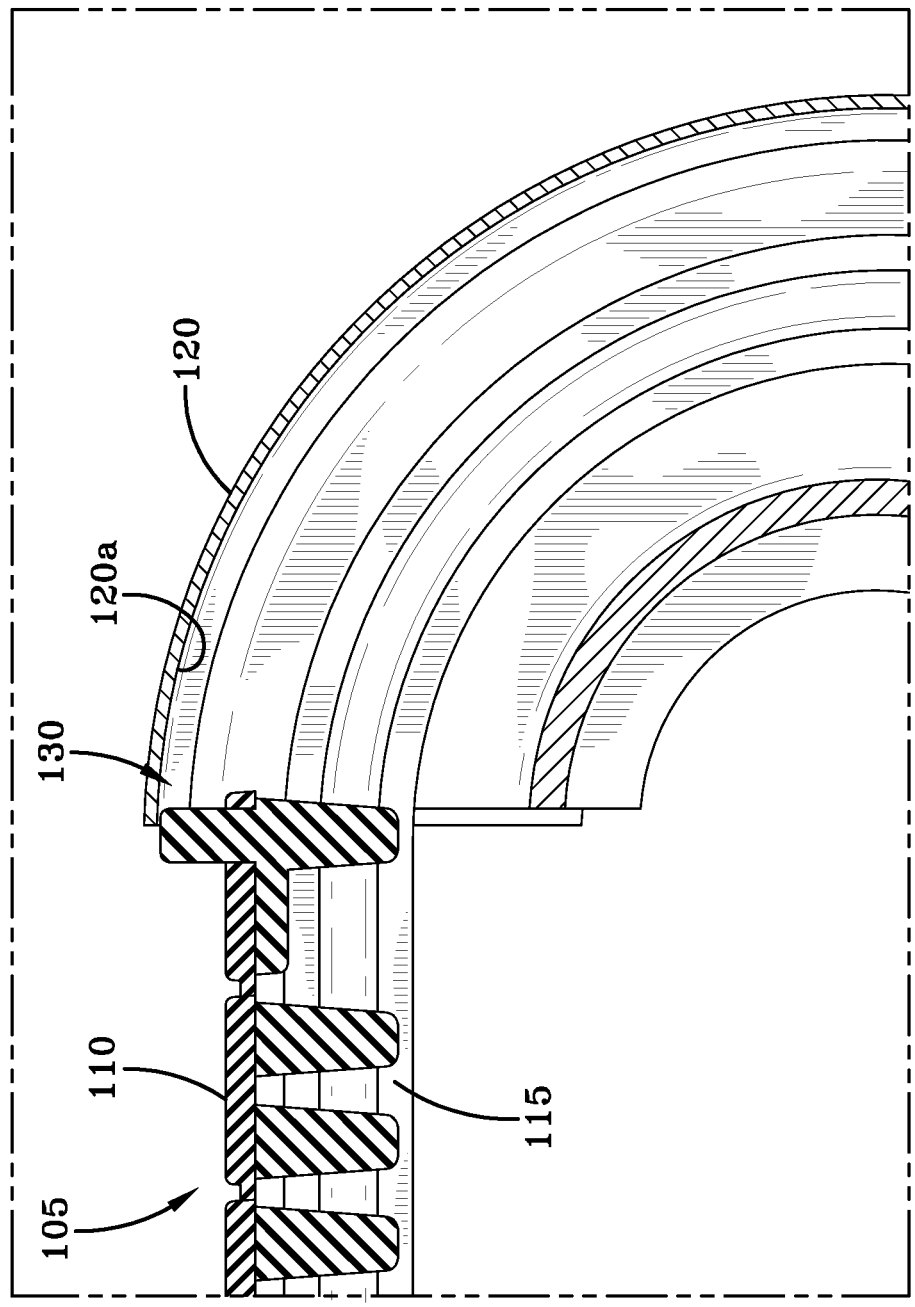
FIG. 5 is an enlarged view of a portion of the sliding flexible lid assembly as indicated in FIG. 4.

One exemplary embodiment of a sliding flexible lid assembly 100 for use with an associated storage compartment is shown in FIGS. 2-6. The particular sliding flexible lid assembly (hereinafter "lid assembly") shown and described herein is designed for use with a vehicle storage compartment, such as a center console storage compartment. However, it should be apparent that a similar design could also be used in conjunction with other devices that employ tambour-style lids.

The exemplary lid assembly 100 is shown in FIGS. 2-6 with other portions of an associated storage compartment housing removed for clarity. As would be well understood by one of skill in the art, the lid assembly 100 viewable in the drawing figures would actually be installed to/within a storage compartment housing such that only a lid 105 portion of the assembly would typically be visible. The lid 105 would normally cover a subjacent storage compartment, which may be accessed by slidably opening the lid as described in more detail below.

As shown, the lid assembly 100 includes the lid 105, which is comprised of a plurality of flexibly interconnected lid segments 110. Such lids are well known in the art and, therefore, need not be discussed in detail herein. In this particular embodiment, the non-interconnected opposite ends of the lid segments 110 are slidably retained in opposed guide rails 115 that direct the sliding movement of the lid 105 during opening and closing thereof. As this particular lid assembly 100 is designed for use with a vehicle center storage console, the guide rails 115 extend for some distance in a substantially horizontal plane before curving downward toward what would be the floor of an associated vehicle. During opening and closing, the flexible nature of the lid 105 allows it to follow the curved path defined by the guide rails 115. Other guides may be employed in other embodiments. Thus, the lid of a lid assembly may be guided by other than a pair of opposed guide rails.

A cover plate 120 overlies at least an upper surface of a rearward portion of the guide rails 115, such that an inner wall 120a of the cover plate is adjacent the top surface of the lid 105 when the lid is slid rearward (opened). In this particular exemplary embodiment of the lid assembly 100, the cover plate 120 is actually in the form of a lid enclosure 145 that surrounds a rearward portion of the guides 115 and has an open interior into which the lid 105 disappears when opened. In other embodiments, the cover plate 120 may simply be a plate that resides along only the upper surface of the guide rails 115. In either case, the cover plate may be a separate element that is attached to the guide rails 115 or another element of the lid assembly 100 and resides within an associated storage compartment housing, or it may be an integral part of a storage compartment housing to which the lid and guides of the lid assembly are installed. Therefore, while the cover plate 120 (lid enclosure 145) is shown to be a separate element herein for purposes of illustration, other designs are possible.

A handle 140 may be provided at or near a leading (forward) end 105a of the lid 105. More importantly, and as can be best observed in FIGS. 2-3, a plurality of ribs 125 extend outward (upward in this case) from the exposed top surface of the lid 105 near a trailing (rearward) end 105b thereof. In other embodiments of the invention (not shown), the plurality of ribs 125 may be replaced by a single upwardly protruding rib that extends across or substantially across the top surface of the lid in a direction that is transverse or substantially transverse to the sliding direction thereof.

The upwardly extending orientation of the ribs 125 along the rearward end 105b of the lid allows the ribs to block objects from passing between any gap G that might exist between the top surface of the lid and the cover plate 120 or an overlying portion of an associated storage compartment housing when the lid is closed. This would not be the case if the ribs 125 are oriented to extend from, for example, a rear face of the lid 105 and in a direction substantially parallel to the path of travel of the lid.

As described in more detail below, and as is best illustrated in the partially transparent view of FIG. 6, the ribs 125 also prevent objects that pass through the gap G during lid opening from being lost within the interior of a storage compartment housing. Again, arranging the ribs 125 to extend outward from the top surface of the lid 105 allows the free ends of the ribs 125 to extend into corresponding grooves 130 that run linearly along the path of travel of the lid to form a lid track 135 (see FIG. 6) in an adjacent inner wall 120a of the cover plate 120. This would not be possible if the ribs 125 are made to extend rearward from a rear face of a tambour-style lid. Nor would such a design allow lost items to be returned to a readily accessible position upon closing of a tambour-style or pivoting lid, as is described in more detail below as occurring with a sliding lid of the present invention.

The grooves 130 may be dimensioned such that a slight gap exists between the grooves and the ribs 125, or the ribs may actually contact one or more walls of the grooves. The ribs 125 and grooves 130 may be provided in varying number, such that the number of ribs and grooves on a given lid may be lesser or greater than the number shown in the drawing figures. For example, a single rib and corresponding groove may replace the plurality of spaced ribs and grooves shown and described with respect to the exemplary embodiment shown herein. The rib-to-rib and corresponding groove-to-groove spacing may also vary accordingly and may depend on, for example, the width of the lid and/or on an expected size of potential objects that the ribs might be required to collect.

Figure 6:
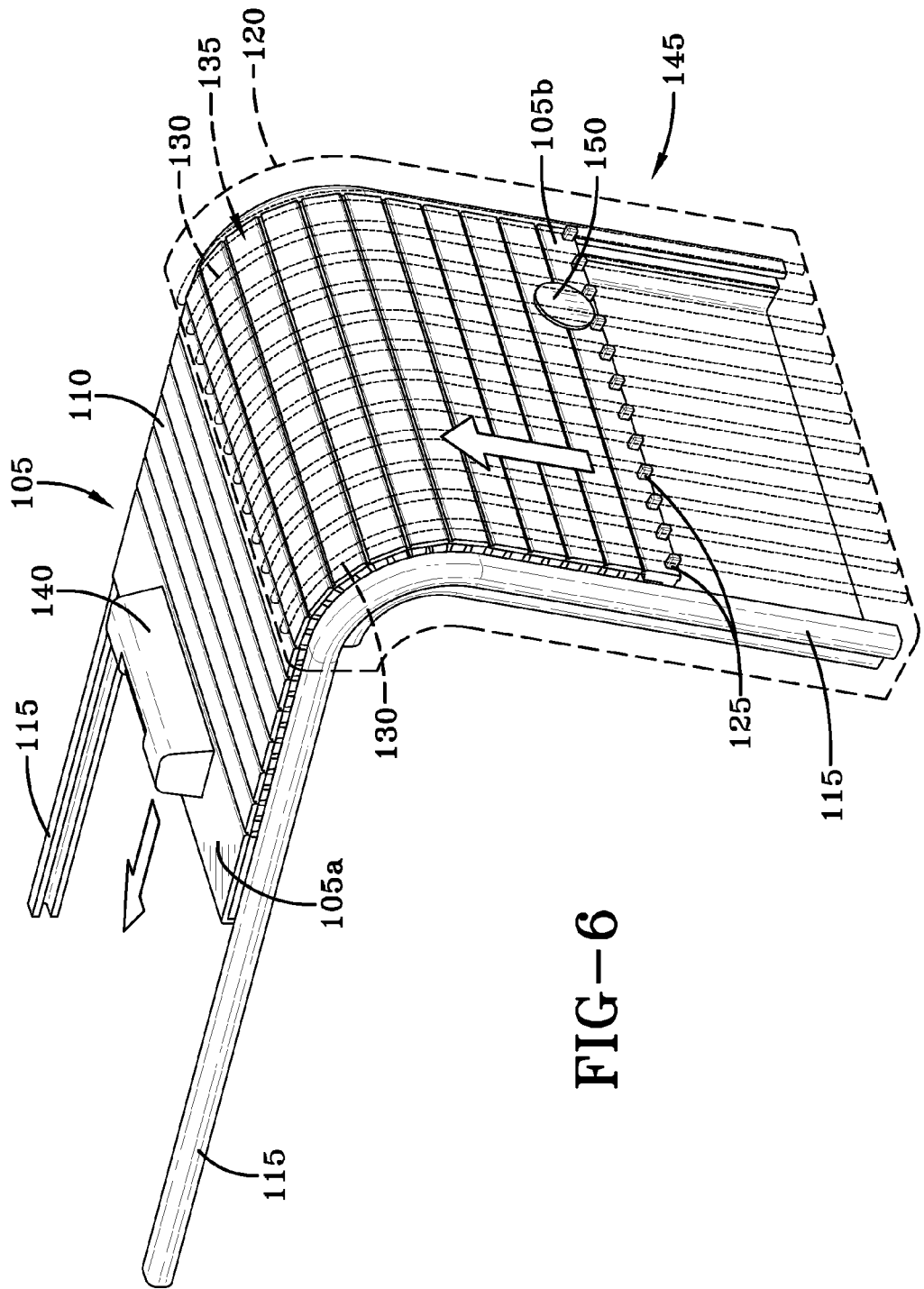
FIG. 6 is a isometric rear view of the sliding flexible lid assembly of FIG. 2 with a cover plate portion thereof shown in partial transparency to reveal a partially retracted (opened) lid.

Referring to FIG. 6, the interaction of the ribs 125 on the lid 105 with the grooves 130 in the cover plate 120 during sliding of the lid can be observed. As shown, the lid 105 is being returned toward a closed position from an open or partially open position (as indicated by the arrows). As such, a portion of the lid 105 resides beneath the cover plate 120 (within the lid housing 145) and the ribs 125 on the lid extend at least partially into the grooves 130 therein.

Based on the extension of the ribs 125 into the grooves 130, it can be understood that an object carried rearward along the top surface of the lid 105 during lid opening cannot pass between the ribs and the inner wall 120a of the guide housing. Further, unless such an object is small enough to pass through both the gap G between the top surface of the lid 105 and the cover plate 120, and the space between adjacent ribs 125, the ribs will prevent the object from traveling past the rearward end of the lid and becoming lost in the interior space of the associated storage compartment housing.

Therefore, as illustrated in FIG. 6, an object 150 that does travel with the lid 105 through the gap G, will be restrained by the ribs 125 and trapped within the space formed between the top surface of the lid 105 and the inner wall 120a of the cover plate 120. Consequently, when the lid 105 is subsequently returned to a closed position, the ribs 125 will cause the object 100 to be carried along with the lid until the object emerges through the gap G between the lid 105 and cover plate 120 where it can be easily retrieved.

While the rib-to-rib spacing of the exemplary embodiment shown and described herein appears quite large for purposes of clarity, it should be apparent that the ribs provided on a lid of the present invention may be spaced at a sufficiently small distance from one another to catch virtually any object that might pass through the gap G, and to return such objects as described above. Thus, a lid assembly of the present invention ensures that objects that do pass into a storage compartment housing with a sliding lid will be returned upon lid closing rather than being irretrievably lost absent storage compartment disassembly.

While certain embodiments of the present invention are described in detail above, the scope of the invention is not to be considered limited by such disclosure, and modifications are possible without departing from the spirit of the invention as evidenced by the following claims:

What is claimed is:

1. A flexible sliding lid assembly, comprising:
    a lid comprised of a plurality of flexibly interconnected lid segments;
    a guide adapted to direct sliding movement of the lid;
    a cover plate located to overlie at least a portion of a top surface of the lid when the lid is in an open or partially open position, the cover plate located such that the lid is able to pass beneath the cover plate during sliding movement thereof;
    at least one groove located in an inner wall of the cover plate, the at least one groove running linearly along a path of travel of the lid; and
    at least one rib extending outward from a top surface of the lid and arranged near a rearward end thereof, the at least one rib aligned with the at least one groove in the cover plate and dimensioned to extend at least partially into the at least one groove in the cover plate such that the at least one rib travels within the at least one groove during sliding movement of the lid.

2. The flexible sliding lid assembly of claim 1, wherein the assembly is part of a vehicle storage compartment assembly.

3. The flexible sliding lid assembly of claim 2, wherein vehicle storage compartment assembly is a vehicle center console assembly.

4. The flexible sliding lid assembly of claim 1, wherein the cover plate is an integral part of a storage compartment housing.

5. The flexible sliding lid assembly of claim 1, wherein the cover plate is an independent element that attaches to the guide.

6. The flexible sliding lid assembly of claim 1, wherein the cover plate is a part of a lid housing that substantially surrounds at least a portion of the guide.

7. The flexible sliding lid assembly of claim 1, wherein the guide includes a pair of opposed guide rails that extend along opposite side edges of the lid, the guide rails adapted to slidably retain non-interconnected opposite ends of the lid segments.

8. The flexible sliding lid assembly of claim 1, wherein the at least one rib resides at least partially in the at least one groove when the lid is in a fully forward, closed position.

9. A flexible sliding lid assembly, comprising:
    a lid comprised of a plurality of flexibly interconnected lid segments;
    a pair of opposed guide rails that extend along opposite sides of the lid and define an intended path of travel thereof, the guide rails adapted to slidably retain non-interconnected opposite ends of the lid segments and to direct sliding movement of the lid;
    a cover plate overlying at least an upper surface of a portion of the guide rails near a rearward end of the lid such that the lid is able to pass beneath the cover plate during sliding movement thereof;
    a plurality of spaced apart grooves located in an inner wall of the cover plate, the grooves running linearly along the path of travel of the lid; and
    a plurality of spaced apart ribs extending outward from a top surface of the lid and arranged near a rearward end thereof, the ribs aligned with the grooves in the cover plate and extending at least partially into the grooves such that the ribs travel within the grooves when the lid is slidably displaced.

10. The flexible sliding lid assembly of claim 9, wherein the assembly is part of a vehicle storage compartment assembly.

11. The flexible sliding lid assembly of claim 10, wherein vehicle storage compartment assembly is a vehicle center console assembly.

12. The flexible sliding lid assembly of claim 9, wherein the cover plate is an integral part of a storage compartment housing.

13. The flexible sliding lid assembly of claim 9, wherein the cover plate is an independent element that attaches to the guide rails.

14. The flexible sliding lid assembly of claim 9, wherein the cover plate is a part of a lid housing that substantially surrounds at least a portion of the guide rails.

15. The flexible sliding lid assembly of claim 9, wherein the ribs reside at least partially in the grooves when the lid is in a fully forward, closed position.

16. A vehicle storage compartment having a flexible sliding lid with an object return feature, comprising:
    a vehicle storage compartment housing;
    a lid comprised of a plurality of flexibly interconnected lid segments, the lid provided to selectively cover a storage compartment in the storage compartment housing;
    a pair of opposed guide rails affixed to the storage compartment housing, the guide rails extending along opposite sides of the lid and defining an intended path of travel thereof, the guide rails adapted to slidably retain non-interconnected opposite ends of the lid segments and to direct sliding movement of the lid;
    a cover plate overlying at least an upper surface of a portion of the guide rails near a rearward end of the lid such that the lid is able to pass beneath the cover plate during sliding movement thereof;
    a plurality of spaced apart grooves formed in the inner wall of the cover plate, the grooves running linearly along the path of travel of the lid; and
    a plurality of spaced apart ribs extending outward from a top surface of the lid and arranged along a rearward end thereof, the ribs aligned with the grooves in the cover plate and extending at least partially into the grooves such that the ribs travel within the grooves when the lid is slidably displaced;
    wherein an object traveling into the storage compartment housing on the top surface of the lid will be collected by the ribs and trapped within a space formed between a top surface of the lid and the inner wall of the cover plate, such that the object will be returned upon closing of the lid to an exposed location along a rearward end thereof.

17. The vehicle storage compartment of claim 16, wherein the vehicle storage compartment is a vehicle center console.

18. The vehicle storage compartment of claim 16, wherein the cover plate is an integral part of the storage compartment housing.

19. The vehicle storage compartment of claim 16, wherein the cover plate is an independent element that attaches to the guide rails of the flexible lid assembly.

20. The vehicle storage compartment of claim 16, wherein the cover plate is a part of a lid housing that substantially surrounds at least a portion of the guide rails.

* * * * *